United States Patent
Cheng et al.

(10) Patent No.: US 11,833,618 B2
(45) Date of Patent: Dec. 5, 2023

(54) SOLDER JOINT INSPECTION MODEL TRAINING METHOD, SOLDER JOINT INSPECTION METHOD, AND SOLDER JOINT INSPECTION DEVICE

(71) Applicant: PEGATRON CORPORATION, Taipei (TW)

(72) Inventors: Chun-Chou Cheng, Taipei (TW); Ming-Lung Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 399 days.

(21) Appl. No.: 17/361,646

(22) Filed: Jun. 29, 2021

(65) Prior Publication Data

US 2022/0023977 A1    Jan. 27, 2022

(30) Foreign Application Priority Data

Jul. 23, 2020  (TW) ................................ 109124993

(51) Int. Cl.
*B23K 31/00* (2006.01)
*B23K 31/12* (2006.01)
(Continued)

(52) U.S. Cl.
CPC .......... *B23K 31/125* (2013.01); *B23K 31/006* (2013.01); *G06N 3/045* (2023.01); (Continued)

(58) Field of Classification Search
CPC .. B23K 31/125; B23K 31/006; B23K 1/0016; G06N 3/045; G06N 3/08; G06T 7/001; (Continued)

(56) References Cited

U.S. PATENT DOCUMENTS

| 5,532,739 A * | 7/1996 | Garakani | ............. | B23K 20/007 |
| | | | | 382/150 |
| 7,209,583 B2 * | 4/2007 | Enokido | ............ | B23K 37/0408 |
| | | | | 228/103 |

(Continued)

FOREIGN PATENT DOCUMENTS

| CN | 106530284 A | | 3/2017 | | |
| CN | 108428247 A | * | 8/2018 | ............... | G06T 7/75 |

(Continued)

OTHER PUBLICATIONS

Vitoriano, P.M.A, et al.; "Automatic Optical Inspection for Surface Mounting Devices with IPC-A-610D compliance;" Proceeding of the 2011 International Conference on Power Engineering, Energy and Electrical Drives; May 2011; pp. 1-8.

(Continued)

*Primary Examiner* — Kiley S Stoner
(74) *Attorney, Agent, or Firm* — McClure, Qualey & Rodack, LLP (57) ABSTRACT

A solder joint inspection model training method includes the steps of: training a first identification model according to first sample images to identify a surface-mount device with a solder joint in an image; training a second identification model according to second sample images to identify a surface-mount device without a solder joint in an image; inputting labeled original images to a trained first identification model to output first images; inputting the first images to a trained second identification model to output second images; masking the first images with the second images to generate images with normal solder joints and images with abnormal solder joints; and training a solder joint inspection model based on the images with normal solder joints and the images with abnormal solder joints.

11 Claims, 7 Drawing Sheets

(51) Int. Cl.
*G06T 7/00* (2017.01)
*G06N 3/08* (2023.01)
*G06N 3/045* (2023.01)

(52) U.S. Cl.
CPC .............. *G06N 3/08* (2013.01); *G06T 7/001* (2013.01); *G06T 2207/20081* (2013.01); *G06T 2207/20084* (2013.01); *G06T 2207/30152* (2013.01)

(58) Field of Classification Search
CPC . G06T 2207/20081; G06T 2207/20084; G06T 2207/30152; G06T 7/0004
USPC ........................................ 228/102–105, 8–12
See application file for complete search history.

(56) References Cited

U.S. PATENT DOCUMENTS

| | | | | |
|---|---|---|---|---|
| 2020/0327654 | A1* | 10/2020 | Zhang | G06N 3/04 |
| 2022/0266395 | A1* | 8/2022 | Murakami | B23K 31/125 |
| 2022/0398714 | A1* | 12/2022 | Sun | B23K 1/20 |

FOREIGN PATENT DOCUMENTS

| | | | | | |
|---|---|---|---|---|---|
| CN | 109447986 | A | * | 3/2019 | ........... G06T 7/0004 |
| CN | 110321933 | A | | 10/2019 | |
| CN | 111783621 | A | * | 10/2020 | ......... G06K 9/00268 |
| CN | 114119461 | A | * | 3/2022 | |
| CN | 114596290 | A | * | 6/2022 | |
| CN | 114663353 | A | * | 6/2022 | |
| KR | 102012318 | B1 | * | 8/2019 | |
| TW | 201930908 | A | | 8/2019 | |
| TW | 1744999 | B | * | 11/2021 | |

OTHER PUBLICATIONS

Huang, W., et al.; "A Pcb Dataset for Defects Detection and Classification;" Journal of Latex Class Files, Aug. 2018, vol. 14 No. 8; pp. 1-9.

* cited by examiner

SOLDER JOINT INSPECTION MODEL TRAINING METHOD, SOLDER JOINT INSPECTION METHOD, AND SOLDER JOINT INSPECTION DEVICE

CROSS-REFERENCE TO RELATED APPLICATION

This application claims priority to Taiwan Application Serial Number 109124993, filed on Jul. 23, 2020, which is herein incorporated by reference in its entirety.

BACKGROUND

Field of Invention

The present disclosure relates to an electronic device and a method. In detail, the present disclosure relates to a solder joint inspection method, a solder joint inspection model training method, and a solder joint inspection device.

Description of Related Art

In a traditional method such as neural model supervised learning for inspecting abnormal solder joints of surface-mount devices on printed circuit boards, abnormal images in different situations need to be collected, which causes huge consumption of human and time resources. A tougher problem is that a difference between a normal picture and an abnormal picture cannot be highlighted. During training of a neural model, an optimized loss function is not easily converged. As a result, the model often cannot obtain a capability of identifying normal or abnormal solder joints from the training process, accuracy of the trained model is insufficient, and a misjudgment rate is often kept high, which require more additional manpower and time to for determination.

Although some inspection methods may use normal pictures as training data, which omits collection of abnormal images, features obtained after picture extraction often cannot effectively replace the original drawing, and neural models that adopt voting are not diversified enough. Even if a number of models are increased, the determination capability is not improved, resulting in a failure to improve accuracy of the determination capability as expected. Therefore, the above technical defects and disadvantages in the art are yet to be resolved.

SUMMARY

An aspect of the present disclosure relates to a solder joint inspection model training method adapted for training a solder joint inspection model. The solder joint inspection model is configured to inspect whether a solder joint of a surface-mount device is abnormal. The solder joint inspection model training method includes the steps of: training a first identification model according to a plurality of first sample images to identify a surface-mount device with a solder joint in an image; training a second identification model according to a plurality of second sample images to identify a surface-mount device without a solder joint in an image; inputting a plurality of labeled original images to a trained first identification model to output a plurality of first images, where each of the plurality of first images includes a surface-mount device with a solder joint; inputting the plurality of first images to a trained second identification model to output a plurality of second images, where each of the plurality of second images includes a surface-mount device without a solder joint; masking the plurality of first images with the plurality of second images to generate a plurality of images with normal solder joints and a plurality of images with abnormal solder joints; and training a solder joint inspection model based on the plurality of images with normal solder joints and the plurality of images with abnormal solder joints.

Another aspect of the present disclosure relates to a solder joint inspection method. The solder joint inspection method includes the steps of: inputting a to-be-inspected image to a first identification model to obtain a first image, where the first identification model is configured to identify a surface-mount device with a solder joint in the to-be-inspected image; inputting the first image to a second identification model to obtain a second image, where the second identification model is configured to identify the surface-mount device; masking the first image with the second image to generate a third image, and inputting the third image to a solder joint inspection model; and determining, according to an output result of the solder joint inspection model, whether the solder joint in the to-be-inspected image is abnormal.

Another aspect of the present disclosure relates to a solder joint inspection device. The solder joint inspection device includes a storage unit and a processor. The storage unit is configured to store a first identification model, a second identification model, and a solder joint inspection model. The processor is configured to complete actions of: training a first identification model according to a plurality of first sample images to identify a surface-mount device with a solder joint in an image; training a second identification model according to a plurality of second sample images to identify a surface-mount device without a solder joint in an image; inputting a plurality of labeled original images to a trained first identification model to output a plurality of first images, where each of the plurality of first images includes a surface-mount device with a solder joint; inputting the plurality of first images to a trained second identification model to output a plurality of second images, where each of the plurality of second images includes a surface-mount device without a solder joint; masking the plurality of first images with the plurality of second images to generate a plurality of images with normal solder joints and a plurality of images with abnormal solder joints; and training a solder joint inspection model based on the plurality of images with normal solder joints and the plurality of images with abnormal solder joints.

According to the above embodiments, in the present disclosure, a target image may be obtained by using a plurality of trained identification models, and then a target image may be identified by using the solder joint inspection model. In this way, it can be quickly inspected whether the solder joint in the surface-mount device is abnormal.

BRIEF DESCRIPTION OF THE DRAWINGS

The content of the present disclosure can be better understood with reference to implementations in the subsequent paragraphs and the following drawings.

DETAILED DESCRIPTION

The spirit of the present disclosure is to be clearly described by using the drawings and detailed description. Anyone with ordinary knowledge in the technical field who understands the embodiments of the present disclosure may change and modify the technologies taught in the present disclosure without departing from the spirit and the scope of the present disclosure.

Open terms such as "include", "comprise", "have", "contain", and the like used herein means including but not limited to.

Figure 1:
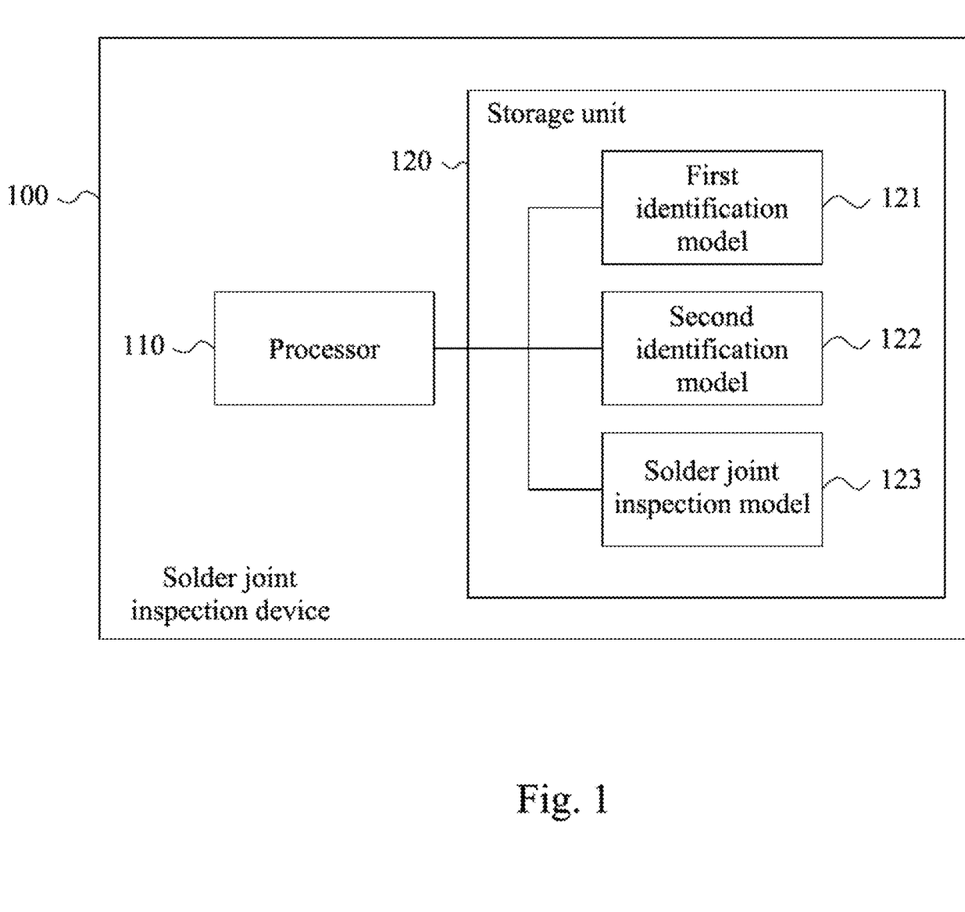
FIG. 1 illustrates a schematic diagram of a solder joint inspection device according to some embodiments of the present disclosure.

FIG. 1 is a schematic diagram of a solder joint inspection device according to some embodiments of the present disclosure. As shown in FIG. 1, the solder joint inspection device 100 includes a processor 110 and a storage unit 120. The storage unit 120 is configured to store a plurality of machine learning models including, for example, a first identification model 121, a second identification model 122, and a solder joint inspection model 123.

In some embodiments, the solder joint inspection device 100 may include a personal computer, a notebook computer, or a server.

In some embodiments, the processor 110 includes, but is not limited to a single processor and an integration of a plurality of microprocessors such as a central processing unit (CPU), a graphics processing unit (GPU), or the like. In some embodiments, the processor 110 is coupled to an external device or a server. In this way, the processor 110 can access instructions from the storage unit 120 to read an image collection or a picture collection stored in the storage unit 120, so as to transmit the image collection or the picture collection to the first identification model 121, the second identification model 122, and the solder joint inspection model 123 to perform a method in the following paragraphs, thereby training the first identification model 121, the second identification model 122, and the solder joint inspection model 123. In order to better understand the method for training the solder joint identification model, specific steps are explained in the following paragraphs.

In some embodiments, the first identification model 121 and the second identification model 122 include a deep neural network, such as a single shot multibox detector (SSD) model, and the solder joint inspection model 123 includes a deep neural network, such as a convolutional neural network (CNN).

Figure 2:
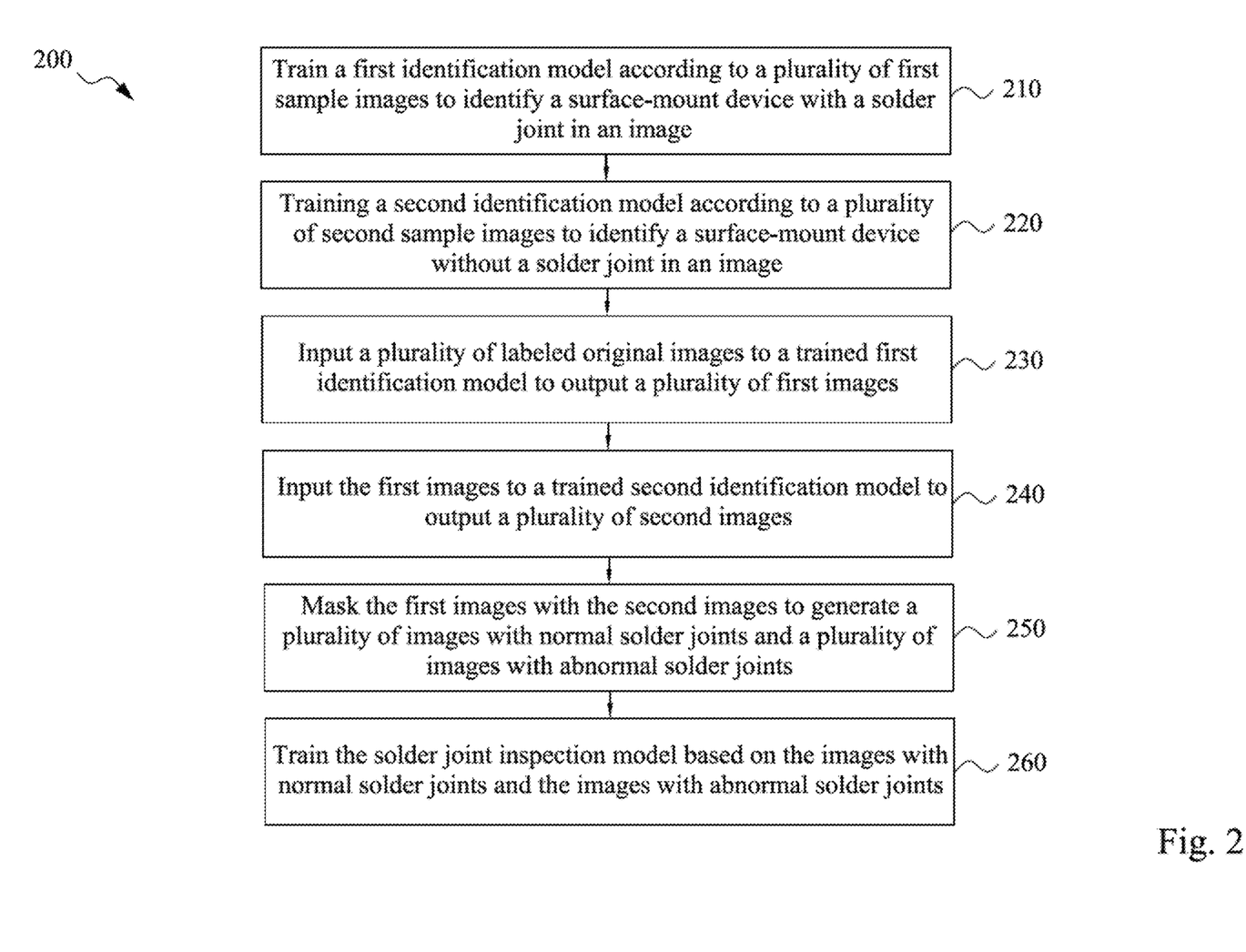
FIG. 2 illustrates a flowchart of a solder joint inspection model training method according to some embodiments of the present disclosure.

FIG. 2 is a flowchart of a solder joint inspection model training method according to some embodiments of the present disclosure. As shown in FIG. 2, in some embodiments, the solder joint inspection model training method 200 may be performed by the solder joint inspection device 100 shown in FIG. 1. In some embodiments, the solder joint inspection model training method 200 is adapted for training the solder joint inspection model 123. The solder joint inspection model 123 is configured to inspect whether a solder joint of a surface-mount device is abnormal. For specific steps of the solder joint inspection model training method 200 are described in the following paragraphs, refer to FIG. 1 and FIG. 2 together.

In step 210, a first identification model is trained according to a plurality of first sample images to identify a surface-mount device with a solder joint in an image.

In some embodiments, the processor 110 trains the first identification model 121 stored in the storage unit 120 according to the plurality of first sample images to identify a surface-mount device with a solder joint in an image. In some embodiments, each of the plurality of first sample images includes a surface-mount device with a solder joint. In detail, the surface-mount device in each of the first sample image has a solder joint.

In some embodiments, the processor 110 trains the first identification model 121 according to the plurality of first sample images and a first coordinate corresponding to the surface-mount device in each of the plurality of first sample images. Specifically, the processor 110 notifies the first identification model 121 of a position of the surface-mount device in the first sample image according to the coordinate of the surface-mount device in the image, so as to train the first identification model 121 according to an exact position of the surface-mount device.

In step 220, a second identification model is trained according to a plurality of second sample images to identify a surface-mount device without a solder joint in an image.

In some embodiments, the processor 110 trains the second identification model 122 stored in the storage unit 120 according to the plurality of second sample images to identify a surface-mount device without a solder joint in an image. In some embodiments, each of the second sample images includes only the surface-mount device but not the solder joint.

In some embodiments, the second identification model 122 is trained according to the plurality of second sample images and a second coordinate corresponding to the surface-mount device in each of the plurality of second sample images. Specifically, the processor 110 notifies the second identification model 122 of a position of the surface-mount device in the second sample image according to the coordinate of the surface-mount device in the image, so as to train the second identification model 122 according to an exact position of the surface-mount device.

In step 230, a plurality of labeled original images is inputted to a trained first identification model to output a plurality of first images.

In some embodiments, the processor 110 inputs the plurality of labeled original images to the first identification model 121 to obtain a plurality of first images. Each of the plurality of first images includes a surface-mount device with a solder joint.

In some embodiments, the plurality of labeled original images includes a plurality of surface-mount device images known to have normal solder joints and a plurality of surface-mount device images known to have abnormal solder joints. In detail, the processor 110 inputs, to the first identification model 121, the plurality of original images known to have normal solder joints or abnormal solder joints to obtain a plurality of images of surface-mount devices which have normal solder joints or abnormal solder joints, that is, the plurality of first images.

In step 240, the plurality of first images is inputted to a trained second identification model to output a plurality of second images.

In some embodiments, the processor 110 inputs the plurality of first images from the first identification model 121 to the second identification model 122 to obtain a plurality of second images. Each of the second images includes a surface-mount device without a solder joint.

In step 250, the plurality of first images is masked with the plurality of second images to generate a plurality of images with normal solder joints and a plurality of images with abnormal solder joints.

In some embodiments, the processor 110 obtains the plurality of second images from the second identification model 122 to mask the plurality of first images obtained from the first identification model 121, thereby generating the plurality of images with normal solder joints and the plurality of images with abnormal solder joints. The processor 110 performs steps 230 to 250 with the plurality of surface-mount device images known to have normal solder joints to obtain a plurality of corresponding images with normal solder joints. Similarly, the processor 110 performs steps 230 to 250 with the plurality of surface-mount device images known to have abnormal solder joints to obtain a plurality of corresponding images with abnormal solder joints. In some embodiments, the image with the abnormal solder joint means that a size, a position, a shape, a color, flatness, integrity, and the like of the solder joint conform to defect determination.

In step 260, a solder joint inspection model is trained based on the plurality of images with normal solder joints and the plurality of images with abnormal solder joints.

In some embodiments, after the processor 110 subjects the plurality of images with normal solder joints and the plurality of images with abnormal solder joints to white balance, the processor 110 trains the solder joint inspection model 123 by using the white balanced images with normal solder joints and the white balanced images with abnormal solder joints, so that the solder joint inspection model 123 can determine whether the solder joints in the images are abnormal.

Figure 3:
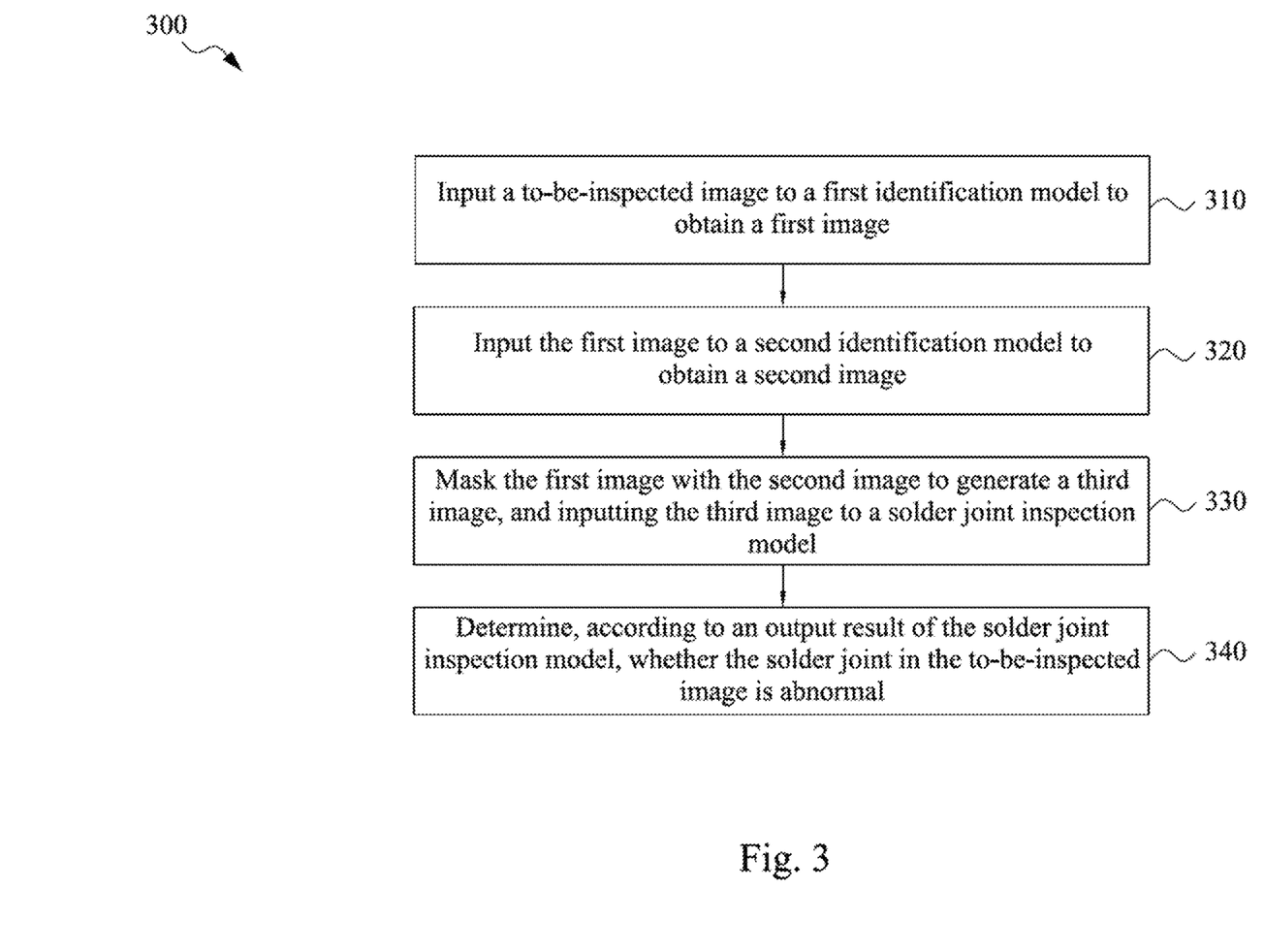
FIG. 3 illustrates a flowchart of a solder joint inspection method according to some embodiments of the present disclosure.

FIG. 3 is a flowchart of a solder joint inspection method according to some embodiments of the present disclosure. The solder joint inspection method 300 may be performed by the solder joint inspection device 100 shown in FIG. 1. The solder joint inspection device 100 includes the first identification model 121, the second identification model 122, and the solder joint inspection model 123 that are trained by using the solder joint inspection model training method 200. In some embodiments, detailed steps of the solder joint inspection method 300 are to be described in the following paragraphs.

In addition, in order to facilitate easy understanding of the solder joint inspection method 300, refer to FIG. 4A to FIG. 4G and FIG. 5A to FIG. 5G. FIG. 4A to FIG. 4G are structural diagrams of a surface-mount device with a normal solder joint according to some embodiments of the present disclosure, and FIG. 5A to FIG. 5G are structural diagrams of a surface-mount device with an abnormal solder joint according to some embodiments of the present disclosure.

In step 310, a to-be-inspected image is inputted to the first identification model to obtain the first image.

Figure 4A:
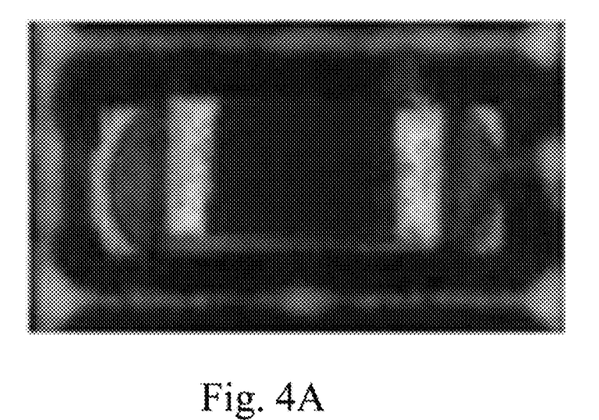
FIG. 4A illustrates a structural diagram of a surface-mount device with a normal solder joint according to some embodiments of the present disclosure.
Figure 4B:
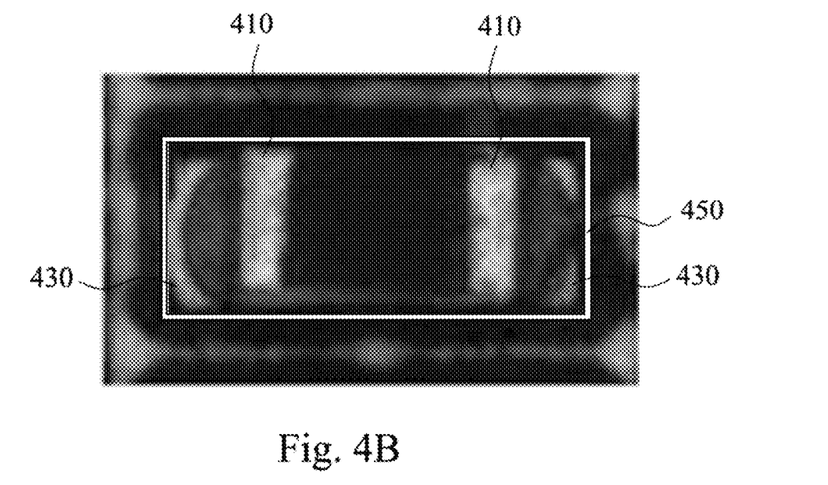
FIG. 4B illustrates a structural diagram of the surface-mount device with the normal solder joint according to some embodiments of the present disclosure.

In some embodiments, the solder joint inspection device 100 obtains a to-be-inspected image shown in FIG. 4A. Then, the processor 110 inputs the to-be-inspected image to the first identification model 121. Subsequently, as shown in FIG. 4B, the first identification model 121 captures a first target region 450 in the to-be-inspected image, and uses the first target region 450 as a first image shown in FIG. 4C. The first image includes a surface-mount device with a solder joint. In some embodiments, the first target region 450 may be a region of interest (ROI).

Figure 4C:
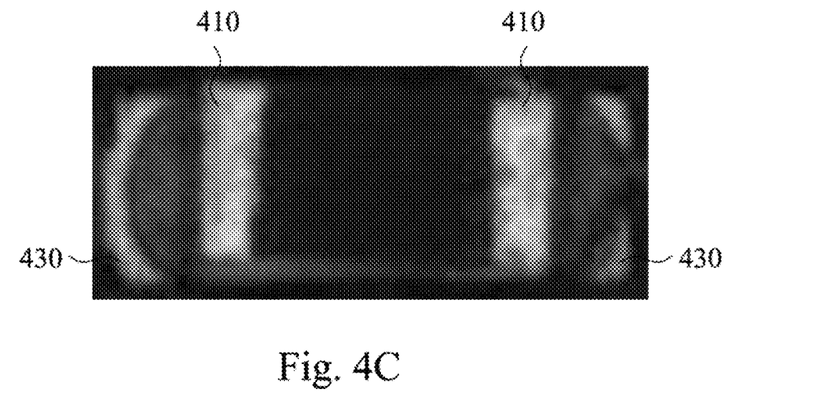
FIG. 4C illustrates a structural diagram of the surface-mount device with the normal solder joint according to some embodiments of the present disclosure.

As shown in FIG. 4B, the first target region 450 includes a surface-mount device 410 and a solder joint 430, and the processor 110 further magnifies the first target region 450 in an equal proportion as the first image shown in FIG. 4C. In this embodiment, the surface-mount device 410 is two rectangle-like structures in a middle part of FIG. 4C, and the solder joint 430 is two half-moon-shaped structures on both sides of FIG. 4C.

In step 320, the first image is inputted to the second identification model to obtain the second image.

Figure 4D:
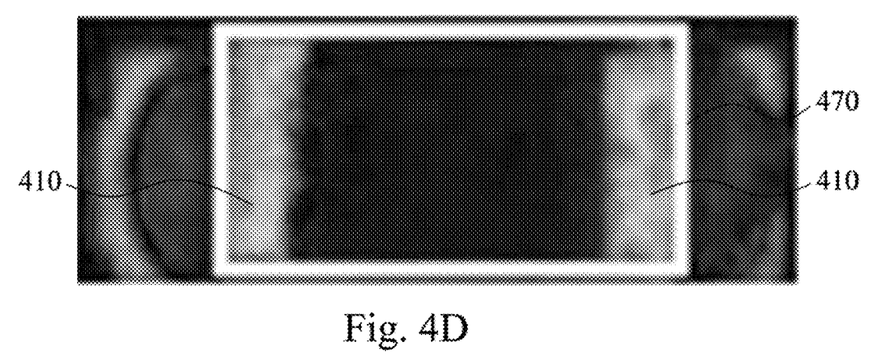
FIG. 4D illustrates a structural diagram of the surface-mount device with the normal solder joint according to some embodiments of the present disclosure.

In some embodiments, the processor 110 of the solder joint inspection device 100 inputs the first image shown in FIG. 4C to the second identification model 122. Then, as shown in FIG. 4D, the second identification model 122 captures a second target region 470 of the first image to obtain a second image shown in FIG. 4E. The second image includes a surface-mount device without a solder joint.

Figure 4E:
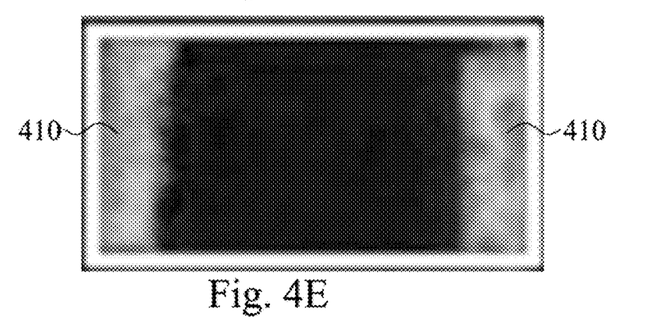
FIG. 4E illustrates a structural diagram of the surface-mount device with the normal solder joint according to some embodiments of the present disclosure.
Figure 4F:
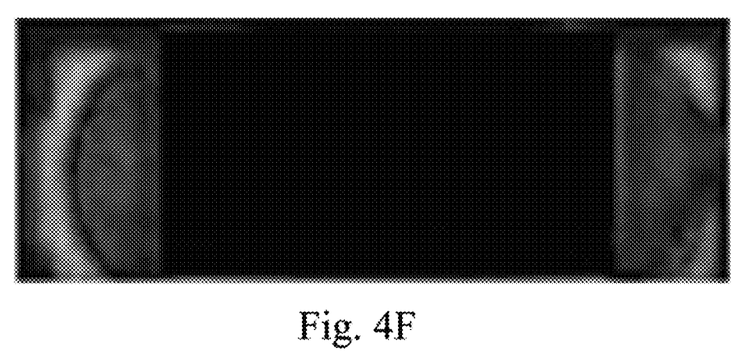
FIG. 4F illustrates a structural diagram of the surface-mount device with the normal solder joint according to some embodiments of the present disclosure.

In some embodiments, the second target region 470 includes a surface-mount device 410, and the processor 110 further captures the second target region 470 as the second image shown in FIG. 4E. In some embodiments, the second target region 470 may be a region of interest (ROI).

In step 330, the first image is masked with the second image to generate a third image, and the third image is inputted to a solder joint inspection model.

Figure 4G:
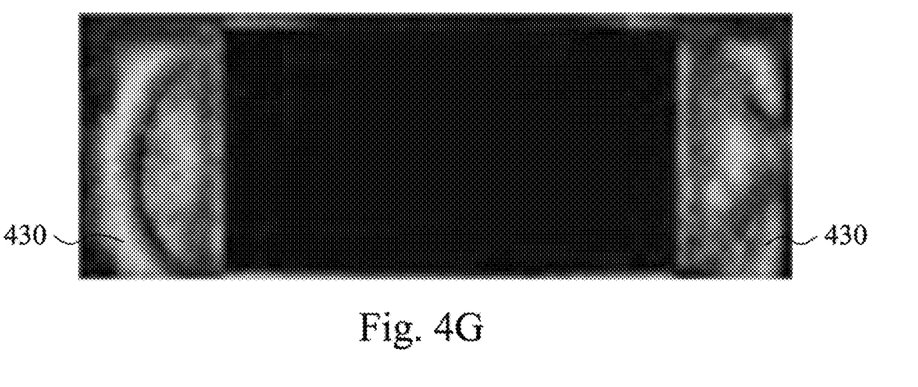
FIG. 4G illustrates a structural diagram of the surface-mount device with the normal solder joint according to some embodiments of the present disclosure.
Figure 5A:
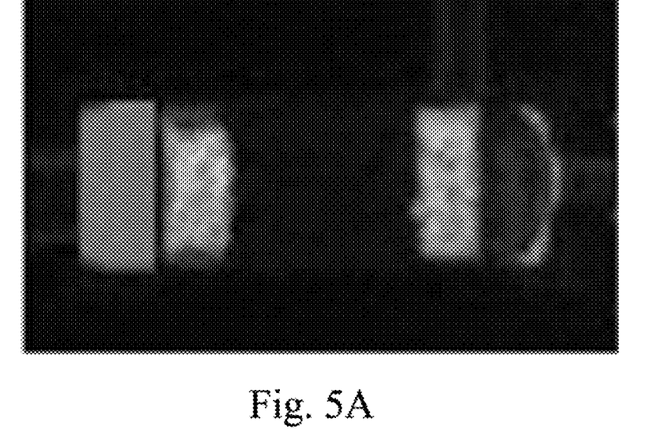
FIG. 5A illustrates a structural diagram of the surface-mount device with the normal solder joint according to some embodiments of the present disclosure.
Figure 5B:
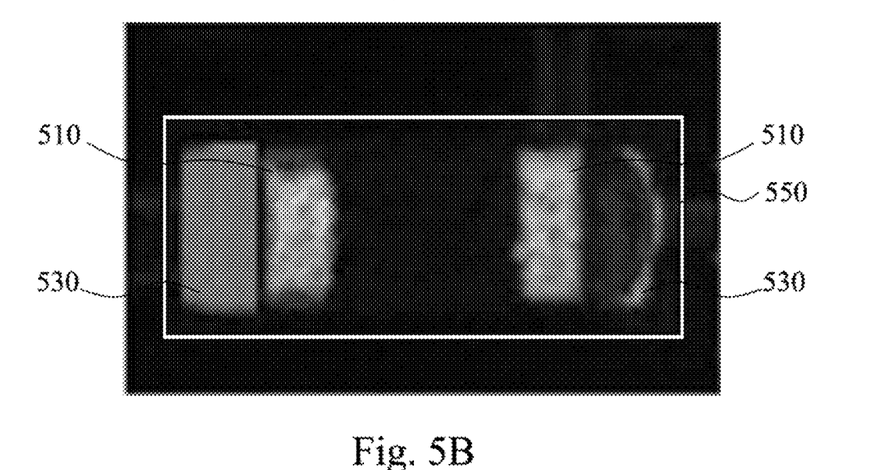
FIG. 5B illustrates a structural diagram of the surface-mount device with an abnormal solder joint according to some embodiments of the present disclosure.
Figure 5C:
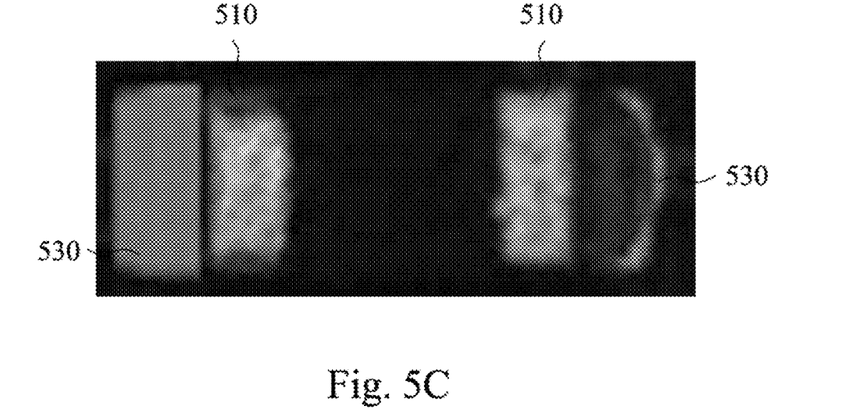
FIG. 5C illustrates a structural diagram of the surface-mount device with an abnormal solder joint according to some embodiments of the present disclosure.
Figure 5D:
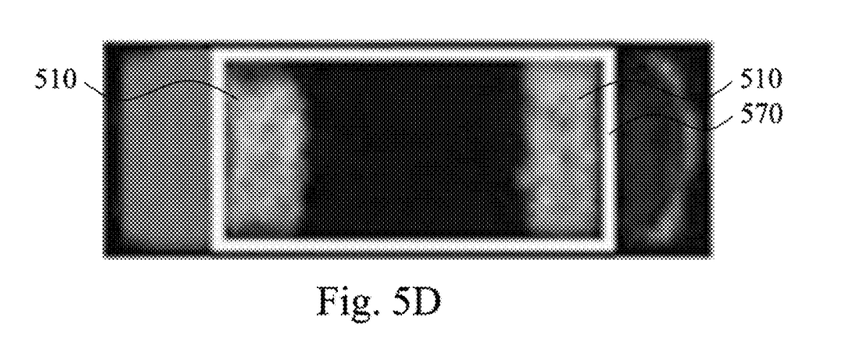
FIG. 5D illustrates a structural diagram of the surface-mount device with an abnormal solder joint according to some embodiments of the present disclosure.
Figure 5E:
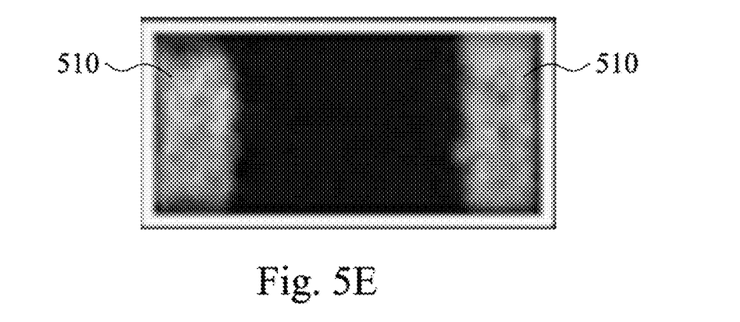
FIG. 5E illustrates a structural diagram of the surface-mount device with an abnormal solder joint according to some embodiments of the present disclosure.

In some embodiments, the processor 110 of the solder joint inspection device 100 masks the first image shown in FIG. 4D with the second image shown in FIG. 5E. The processor masks the surface-mount device 410 at the same position in the image to generate a masked image, and magnifies the masked image at an equal proportion to generate the third image shown in FIG. 4F, that is, an image including only the solder joint. In some embodiments, the processor 110 further subjects the third image shown in FIG. 4F to white balance to obtain the white balanced third image shown in FIG. 4G.

In step 340, it is determined, according to an output result of the solder joint inspection model, whether the solder joint in the to-be-inspected image is abnormal.

In some embodiments, the processor 110 inputs the white balanced third image shown in FIG. 4G to the solder joint inspection model 123 to determine whether the image is abnormal. The above embodiments are described by exemplifying the images with normal solder joints (FIG. 4A to FIG. 4G), and images with abnormal solder joints (FIG. 5A to FIG. 5G) are further exemplified below for description.

In some embodiments, the processor 110 performs step 310 to receive FIG. 5A, and then inputs FIG. 5A to the first identification model 121. Then, the first identification model 121 captures a first target region 550 from FIG. 5B as a first image shown in FIG. 5C. The first image includes a surface-mount device with a solder joint. The first target region 550 includes a surface-mount device 510 and a solder joint 530. Then, the processor 110 performs step 320 to capture a second target region 570 from FIG. 5D as a second image shown in FIG. 5E. The second image includes the surface-mount device without a solder joint. The second target region 570 includes a surface-mount device 510. In some embodiments, the first target region 550 and the second target region 570 may be regions of interest (ROI).

Figure 5F:
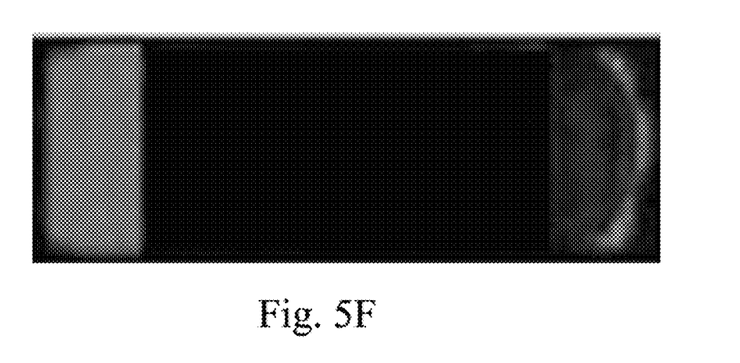
FIG. 5F illustrates a structural diagram of the surface-mount device with an abnormal solder joint according to some embodiments of the present disclosure.

Furthermore, the processor 110 performs step 330, masks the surface-mount device 510 at the same position in the image in FIG. 5D with the second image shown in FIG. 5E, and obtains a third image shown in FIG. 5F. The processor 110 subjects the third image shown in FIG. 5F to white balance to obtain the white balanced third image shown in FIG. 5G. Subsequently, the processor 110 inputs the white balanced third image shown in FIG. 5G to the solder joint inspection model 123 to determine whether the solder joint 530 shown in FIG. 5G is abnormal.

Figure 5G:
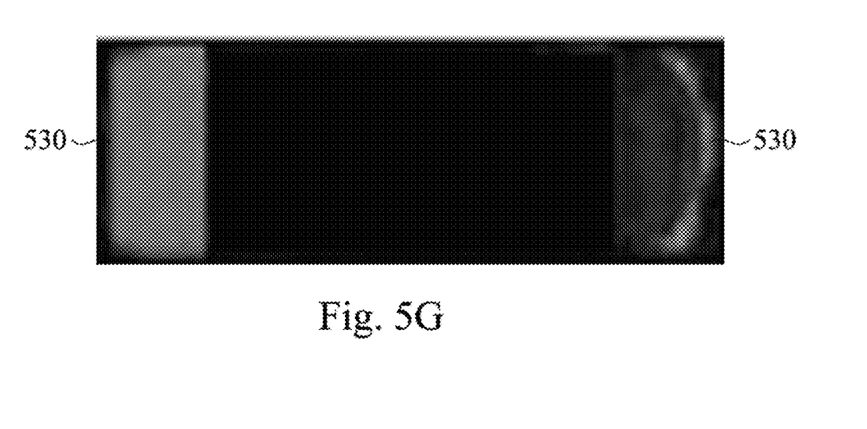
FIG. 5G illustrates a structural diagram of the surface-mount device with an abnormal solder joint according to some embodiments of the present disclosure.

In some embodiments, referring to FIG. 4G and FIG. 5G, the image with normal solder joints is shown in FIG. 4G, in which the solder joint is two half-moon-shaped structures on both sides of the figure. Referring to FIG. 5G, in comparison to the solder joints 430 on both sides of FIG. 4G and a solder joint 530 on a right side of FIG. 5G, only the solder joint 530 on a left side of FIG. 5G is not a half-moon-shaped structure, which indicates that the solder joint 530 on the left side is abnormal.

As described above, in the present disclosure, the solder joint 430 in FIG. 4G or the solder joint 530 in FIG. 5G is obtained by using two identification models, and the normal solder joint 430 and the abnormal solder joint 530 are identified only by using the solder joint inspection model 123. In this way, it can be quickly inspected whether the solder joint in the surface-mount device is abnormal.

In some embodiments, a recursive solder joint inspection method may be performed in the present disclosure. The recursive solder joint inspection method is as follows. Referring to FIG. 1, FIG. 3, FIG. 4A to FIG. 4G, and FIG. 5A to FIG. 5G, a printed circuit board (PCB) may include a plurality of device structures shown in FIG. 4A or FIG. 5A, and the processor 110 of the present disclosure can inspect and capture images of the plurality of device structures shown in FIG. 4A or FIG. 5A. The above is the step of image capturing.

Then, after related steps in FIG. 4B to FIG. 4C and FIG. 5B to FIG. 5C are performed, the processor 110 inspects and captures, from a plurality of second target regions shown in FIG. 4D and FIG. 5D, a printed circuit board structure or a device structure that needs to be masked. The captured printed circuit board structure or the device structure that needs to be masked is, for example, the masked image shown in FIG. 4E and FIG. 5E. The above is the step of masking and capturing. In detail, the printed circuit board structure or the device structure that needs to be masked is, for example, a central processing unit (CPU), a resistor, a capacitor, and a printed circuit board structure.

Next, the masking step in step 330 is performed on the masked image. In detail, in step 330, the image in FIG. 4D is masked by the masked image in FIG. 4E. The above is the step of masking. Subsequently, the recursive solder joint inspection method may be performed in the present disclosure. By continuously repeating the above steps of image capturing, masking and capturing, and masking to mask a non-target structure (for example, the printed circuit board structure or the device structure), retaining a target structure (for example, the solder joint 430 shown in FIG. 4G).

According to the above embodiments, the present disclosure provides a solder joint inspection model training method, a solder joint inspection method, and a solder joint inspection device. A target image may be obtained by virtue of a plurality of trained identification models, and then the target image may be identified by using the solder joint inspection model. In this way, it can be quickly inspected whether the solder joint in the surface-mount device is abnormal.

Furthermore, the recursive solder joint inspection method may be performed in the present disclosure. By continuously performing the steps of image capturing, masking and capturing, and masking, the target image can be optimized in a short time to greatly improve accuracy of identification.

Although the present disclosure is disclosed above by using the specific embodiments, the present disclosure does not exclude other feasible implementations. Therefore, the protection scope of the present disclosure is subject to those defined by the attached claims, rather than being restricted by the above embodiments.

Those skilled in the art may make various changes and refinements to the present disclosure without departing from the spirit and the scope of the present disclosure. All of the changes and modifications made to the present disclosure based on the above embodiments are also within the protection scope of the present disclosure.

What is claimed is:

1. A solder joint inspection model training method, adapted for training a solder joint inspection model, wherein the solder joint inspection model is configured to inspect whether a solder joint of a surface-mount device is abnormal, and the solder joint inspection model training method comprises:

training a first identification model according to a plurality of first sample images to identify a surface-mount device with a solder joint in an image;

training a second identification model according to a plurality of second sample images to identify a surface-mount device without a solder joint in an image;

inputting a plurality of labeled original images to a trained first identification model to output a plurality of first images, wherein each of the first images comprises a surface-mount device with a solder joint;

inputting the first images to a trained second identification model to output a plurality of second images, wherein each of the second images comprises a surface-mount device without an solder joint;

masking the first images with the second images to generate a plurality of images with normal solder joints and a plurality of images with abnormal solder joints; and training the solder joint inspection model based on the images with normal solder joints and the images with abnormal solder joints.

2. The solder joint inspection model training method according to claim 1, wherein the step of training the first identification model according to the first sample images to identify the surface-mount device with a solder joint in the images further comprises:

training the first identification model according to the first sample images and a first coordinate corresponding to the surface-mount device in each of the first sample images, and wherein the step of training the second identification model according to the second sample images to identify the surface-mount device without a solder joint in the images further comprises:

training the second identification model according to the second sample images and a second coordinate corresponding to the surface-mount device in each of the second sample images.

3. The solder joint inspection model training method according to claim 1, wherein the labeled original images comprise a plurality of surface-mount device images known to have normal solder joints and a plurality of surface-mount device images known to have abnormal solder joints.

4. The solder joint inspection model training method according to claim 1, wherein the step of training the solder joint inspection model based on the images with normal solder joints and the images with abnormal solder joints comprises:

subjecting the images with normal solder joints and the images with abnormal solder joints to white balance; and training the solder joint inspection model by using the white balanced images with normal solder joints and the white balanced images with abnormal solder joints.

5. The solder joint inspection model training method according to claim 1, wherein each of the first sample images comprises a surface-mount device with solder joint, and each of the second sample images comprise a surface-mount device without a solder joint.

6. A solder joint inspection method, comprising:

inputting a to-be-inspected image to a first identification model to obtain a first image, wherein the first identification model is configured to identify a surface-mount device with a solder joint in the to-be-inspected image;

inputting the first image to a second identification model to obtain a second image, wherein the second identification model is configured to identify the surface-mount device in the first image;

masking the first image with the second image to generate a third image, and inputting the third image to a solder joint inspection model; and determining, according to an output result of the solder joint inspection model, whether the solder joint in the to-be-inspected image is abnormal.

7. The solder joint inspection method according to claim 6, wherein the step of inputting the to-be-inspected image to the first identification model to obtain the first image comprises:

identifying and capturing, by the first identification model, a first target region in the to-be-inspected image, wherein the first target region comprises the surface-mount device and the solder joint; and magnifying the first target region as the first image.

8. The solder joint inspection method according to claim 7, wherein the step of inputting the first image to the second identification model to obtain the second image comprises:

identifying and capturing, by the second identification model, a second target region in the first image as the second image, wherein the second target region comprises the surface-mount device.

9. The solder joint inspection method according to claim 8, wherein the step of masking the first image with the second image to generate the third image and inputting the third image to the solder joint inspection model comprises:

masking the first image with the second image to generate a masked image; and magnifying the masked image as the third image.

10. The solder joint inspection method according to claim 6, wherein the step of inputting the third image to the solder joint inspection model further comprises:

inputting the third image to the solder joint inspection model after subjecting the third image to white balance.

11. A solder joint inspection device, comprising:

a storage unit configured to store a first identification model, a second identification model and a solder joint inspection model; and a processor configured to perform the steps of:

training the first identification model according to a plurality of first sample images to identify a surface-mount device with a solder joint in an image;

training the second identification model according to a plurality of second sample images to identify a surface-mount device without a solder joint in an image;

inputting a plurality of labeled original images to a trained first identification model to output a plurality of first images, wherein each of the first images comprises a surface-mount device with a solder joint;

inputting the first images to a trained second identification model to output a plurality of second images, wherein each of the second images comprises a surface-mount device without a solder joint;

masking the first images with the second images to generate a plurality of images with normal solder joints and a plurality of images with abnormal solder joints; and training the solder joint inspection model based on the images with normal solder joints and the images with abnormal solder joints.

\* \* \* \* \*